United States Patent
Misawa

(10) Patent No.: US 11,296,549 B2
(45) Date of Patent: Apr. 5, 2022

(54) WIRELESS POWER TRANSMISSION DEVICE AND POWER TRANSFER SYSTEM

(71) Applicant: TOYOTA JIDOSHA KABUSHIKI KAISHA, Toyota (JP)

(72) Inventor: Takahiro Misawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 161 days.

(21) Appl. No.: 16/400,189

(22) Filed: May 1, 2019

(65) Prior Publication Data

US 2019/0356168 A1   Nov. 21, 2019

(30) Foreign Application Priority Data

May 18, 2018   (JP) .............................. JP2018-095962

(51) Int. Cl.
  *H02J 50/12*   (2016.01)
  *H02M 7/5387*   (2007.01)
  *H02J 7/02*   (2016.01)

(52) U.S. Cl.
  CPC ............... *H02J 50/12* (2016.02); *H02J 7/025* (2013.01); *H02M 7/5387* (2013.01)

(58) Field of Classification Search
  CPC ............. H02J 50/12; H02J 5/005; H02J 7/025
  See application file for complete search history.

(56) References Cited

U.S. PATENT DOCUMENTS

| | | | |
|---|---|---|---|
| 10,101,370 B2* | 10/2018 | Lafontaine | G01R 19/2509 |
| 2011/0050166 A1* | 3/2011 | Cook | H02J 50/20 |
| | | | 320/108 |
| 2013/0127409 A1 | 5/2013 | Ichikawa | |
| 2013/0193749 A1 | 8/2013 | Nakamura et al. | |
| 2015/0008877 A1 | 1/2015 | Ichikawa et al. | |
| 2015/0054456 A1* | 2/2015 | Yamakawa | H02J 7/00034 |
| | | | 320/108 |
| 2016/0365752 A1 | 12/2016 | Misawa et al. | |

FOREIGN PATENT DOCUMENTS

| | | |
|---|---|---|
| JP | 2013-110822 A | 6/2013 |
| JP | 2013-126327 A | 6/2013 |
| JP | 2013-146148 A | 7/2013 |
| JP | 2013-146154 A | 7/2013 |
| JP | 2013-154815 A | 8/2013 |
| JP | 2014-207795 A | 10/2014 |
| JP | 2017-005865 A | 1/2017 |

* cited by examiner

*Primary Examiner* — Daniel C Puentes
*Assistant Examiner* — Colleen J O Toole
(74) *Attorney, Agent, or Firm* — Sughrue Mion, PLLC

(57) ABSTRACT

A power supply ECU is configured to carry out extreme value search control for searching for a frequency at which a detected value of power loss is minimized, by oscillating a frequency of output power from an inverter. Then, the power supply ECU determines whether or not extreme value search in extreme value search control is poorly proceeding, and when extreme value search is poorly proceeding, the power supply ECU increases an amplitude of frequency oscillation of output power from the inverter.

7 Claims, 6 Drawing Sheets

WIRELESS POWER TRANSMISSION DEVICE AND POWER TRANSFER SYSTEM

This nonprovisional application is based on Japanese Patent Application No. 2018-095962 filed with the Japan Patent Office on May 18, 2018, the entire contents of which are hereby incorporated by reference.

BACKGROUND

Field

The present disclosure relates to a wireless power transmission device and a power transfer system and particularly to a technique for controlling an inverter in a wireless power transmission device configured to wirelessly transmit power to a power reception device.

Description of the Background Art

A power transfer system configured to wirelessly transfer power from a power transmission device to a power reception device has been known (see, for example, Japanese Patent Laying Open No. 2013-154815, Japanese Patent Laying Open No. 2013-146154, Japanese Patent Laying Open No. 2013-146148, Japanese Patent Laying Open No. 2013-110822, Japanese Patent Laying Open No. 2013-126327, and Japanese Patent Laying Open No. 2017-5865). Japanese Patent Laying Open No. 2017-5865 discloses controlling magnitude of transmission power to target power by regulating a duty of a voltage output from an inverter provided in a power transmission device and controlling a turn-on current of the inverter by regulating a drive frequency for the inverter.

SUMMARY

In a wireless power transmission device described in Japanese Patent Laying Open No. 2017-5865, extreme value search control for searching for a frequency (an extreme value) at which a current flowing through a power transmission coil is minimized is carried out by regulating a drive frequency for an inverter at the time of start of power transmission. In this extreme value search control, an extreme value is searched for based on variation in current (and hence variation in power loss) at the time when a frequency is manipulated. In such a method, however, when sensitivity of variation in current to frequency manipulation becomes lower, extreme value search will poorly proceed and the drive frequency for the inverter (and hence a frequency of output power from the inverter) cannot be controlled to an extreme value.

The present disclosure was made to solve such a problem and an object thereof is to allow, even when extreme value search in extreme value search control by a wireless power transmission device poorly proceeds, a frequency of output power from an inverter to be controlled to an extreme value by overcoming poor proceeding.

A wireless power transmission device in the present disclosure includes a power transmitter configured to wirelessly transmit power to a power reception device, an inverter configured to generate power at a prescribed frequency and output the generated power to the power transmitter, a loss detector configured to detect power loss, and a controller configured to control power output from the inverter (which is also referred to as "output power" below). The controller is configured to carry out extreme value search control for searching for a frequency at which power loss detected by the loss detector is minimized (which is also referred to as an "optimal frequency" below), by oscillating a frequency of the output power (which is also referred to as an "output frequency" below).

The controller is configured to determine whether or not extreme value search in the extreme value search control is poorly proceeding and to increase an amplitude of frequency oscillation of the output power when the extreme value search is poorly proceeding.

A power transfer system according to the present disclosure includes a power transmission device and a power reception device configured to wirelessly receive power from the power transmission device. The wireless power transmission device according to the present disclosure including the features above is provided as the power transmission device.

The controller searches for an extreme value (an optimal frequency) by frequency oscillation (oscillating an output frequency). In such extreme value search control, sensitivity of variation in power loss to frequency manipulation (which is also referred to as "frequency manipulation sensitivity" below) can be enhanced by increasing an amplitude of oscillation of the frequency. By using this fact, in the wireless power transmission device and the power transfer system, when search for an extreme value is poorly proceeding, an amplitude of oscillation of the frequency is increased. Thus, when extreme value search is poorly proceeding, poor proceeding in extreme value search is overcome by enhancing frequency manipulation sensitivity.

Poor proceeding of extreme value search includes not only an example in which extreme value search is not proceeding but also an example in which extreme value search which is being carried out is not proceeding at a normal speed. For example, when change of the output frequency substantially stops in extreme value search and the output frequency does not reach an extreme value, extreme value search is determined as poorly proceeding. Substantial stop encompasses an example in which the output frequency repeats fluctuation but does not come close to a target value (an extreme value). An example in which change of the output frequency in extreme value search is slow and the output frequency does not reach the extreme value even after lapse of an unallowable period of time since start of extreme value search is also determined as poor proceeding of extreme value search.

The controller may be configured to determine whether or not extreme value search in the extreme value search control is poorly proceeding, to perform, when the extreme value search is poorly proceeding, increasing manipulation to increase an amplitude of the frequency oscillation by a prescribed unit width (which is also referred to as a "unit manipulation amount" below) and thereafter make a proceeding determination again as to whether or not the extreme value search is poorly proceeding, and to repeat, when poor proceeding has not been overcome, the increasing manipulation and the proceeding determination until the poor proceeding is overcome.

While frequency manipulation sensitivity is enhanced by increasing an amplitude of oscillation of the frequency, output power tends to pulsate with increase in amplitude of oscillation of the frequency. With pulsation of output power, transmission power becomes unstable. Therefore, an amount of increase in amplitude for overcoming poor proceeding of extreme value search is desirably restricted to a minimum necessary amount. According to the configuration, an amplitude is increased by a prescribed unit width and further increase is made when poor proceeding of extreme value search cannot be overcome by the increased amplitude. When poor proceeding is overcome by increasing the amplitude stepwise (by a unit manipulation amount), increase in amplitude is stopped. Therefore, the possibility of pulsation of output power due to increase in amplitude more than necessary can be lowered.

The controller may be configured to perform decreasing manipulation to decrease the amplitude of the frequency oscillation by the unit manipulation amount when the poor proceeding is overcome by the increasing manipulation.

Frequency manipulation sensitivity may be varied by magnitude of an output frequency. A frequency at which frequency manipulation sensitivity is particularly low of output frequencies is referred to as a "low-sensitivity frequency." When change of an output frequency substantially stops at the low-sensitivity frequency in extreme value search, change of the output frequency is promoted by the increasing manipulation. When poor proceeding of extreme value search is overcome, the output frequency moves past the low-sensitivity frequency and frequency manipulation sensitivity increases. Therefore, when poor proceeding of extreme value search is overcome by the increasing manipulation, preferably, the amplitude of frequency oscillation returns to a state before the increasing manipulation by the decreasing manipulation so that pulsation in output power is suppressed.

A smallest limit value determined by hardware which constitutes the wireless power transmission device may be defined as the unit manipulation amount. According to such a configuration, poor proceeding of extreme value search can be overcome while pulsation in output power is suppressed. Pulsation in output power tends to be less likely as the unit manipulation amount is smaller.

During the extreme value search control, the controller may be configured to vary an output frequency to be closer to the optimal frequency while the controller brings magnitude of the output power from the inverter in conformity with target power, to determine, when the output frequency has converged, whether or not the converged frequency is the optimal frequency, to determine, when the converged frequency is the optimal frequency, that the extreme value search has been completed, and to determine, when the converged frequency is not the optimal frequency, the extreme value search is poorly proceeding. According to such a configuration, whether or not extreme value search is poorly proceeding can suitably be determined.

Any approach to determine whether or not a converged frequency is the optimal frequency is applicable. For example, power loss is minimized at the optimal frequency. Therefore, when power loss detected by the loss detector at the time when the output frequency has converged is greater than a prescribed value (for example, an upper limit value of allowable power loss), the converged frequency may be determined as not being the optimal frequency.

The controller may include a first generator, an extractor, a multiplier, a calculator, and a second generator which will be described below. The first generator generates an oscillation signal indicating a waveform of a first frequency manipulation amount for the frequency oscillation of the output power. The extractor extracts a high-frequency component from a waveform of power loss cyclically detected by the loss detector described previously. The multiplier obtains a multiplication value resulting from multiplication of a loss variation amount by the first frequency manipulation amount, the loss variation amount being represented by the high-frequency component, the first frequency manipulation amount being represented by the oscillation signal. The calculator calculates a second frequency manipulation amount for bringing the multiplication value closer to 0. The second generator generates a drive signal for the inverter by using a prescribed reference frequency, the second frequency manipulation amount, and the oscillation signal.

The configuration above is particularly preferred as a configuration for the controller to carry out extreme value search control from a point of view of accuracy and stability in control as well as costs.

The oscillation signal may be a rectangular wave signal of which amplitude indicating magnitude of the first frequency manipulation amount increases and decreases stepwise. The number of steps of the rectangular wave signal may increase by one each time increasing manipulation is performed by the first generator and the number of steps of the rectangular wave signal may decrease by one each time decreasing manipulation is performed by the first generator. By increasing and decreasing an amplitude stepwise, occurrence of pulsation of output power at the time of increase and decrease in amplitude can be suppressed.

In the wireless power transmission device, the power transmitter may include a resonant circuit including a power transmission coil. The inverter may include a switching element driven by a drive signal from the controller and a freewheel diode connected in parallel to the switching element. The loss detector may be configured to detect the power loss by using a current flowing through the power transmission coil, a current flowing through the inverter, and a turn-on current representing an output current from the inverter at the time of rise of an output voltage from the inverter. With such a loss detector, power loss in the wireless power transmission device can highly accurately and appropriately be detected.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
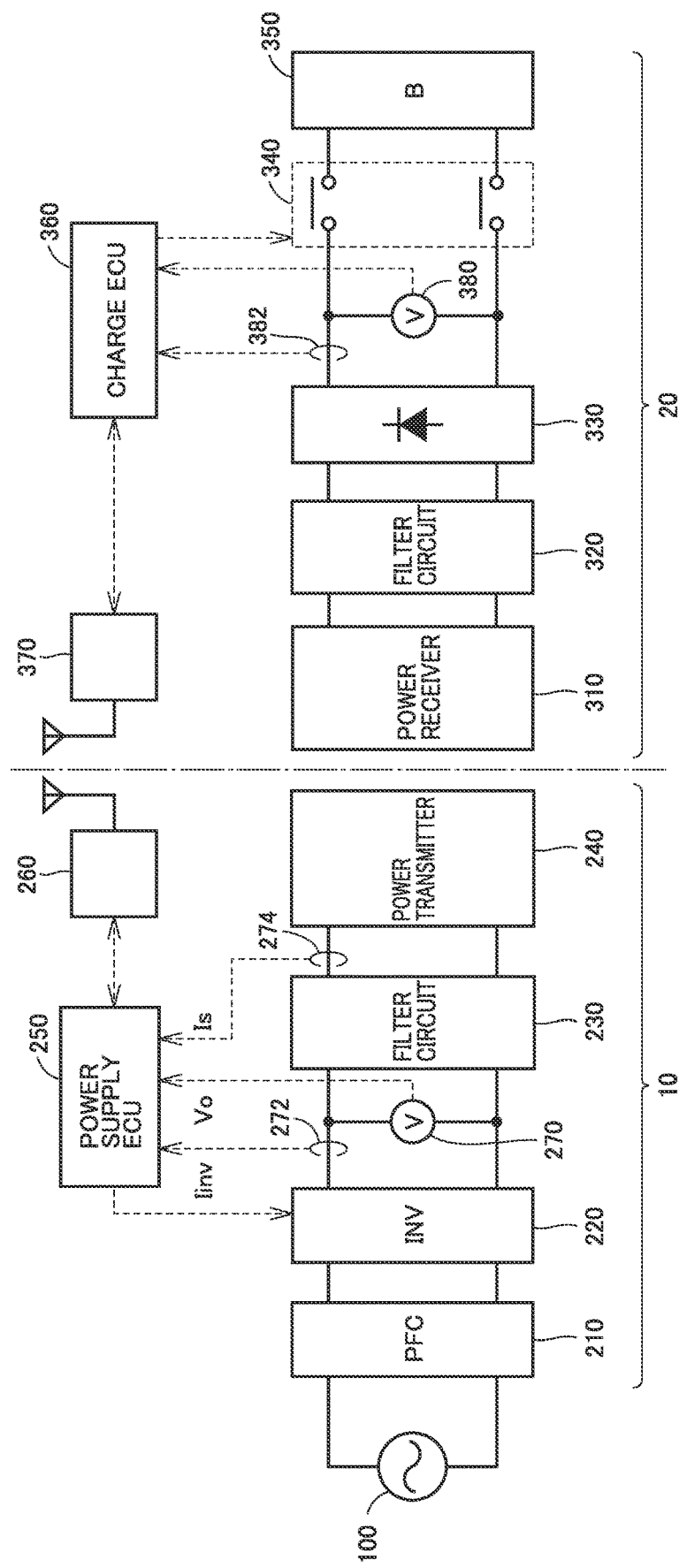
FIG. 1 is a diagram of an overall configuration of a power transfer system according to an embodiment of the present disclosure.

An embodiment of the present disclosure will be described in detail below with reference to the drawings. The same or corresponding elements in the drawings have the same reference characters allotted and description thereof will not be repeated.

FIG. 1 is a diagram of an overall configuration of a power transfer system according to an embodiment of the present disclosure. Referring to FIG. 1, the power transfer system includes a power transmission device 10 and a power reception device 20. Power reception device 20 is mounted, for example, on a vehicle which can travel with electric power supplied from power transmission device 10 and stored therein. Though a resonance scheme is adopted as a wireless power transfer scheme in this embodiment, another scheme (electromagnetic induction scheme and the like) may be adopted.

Power transmission device 10 includes a power factor correction (PFC) circuit 210, an inverter 220, a filter circuit 230, and a power transmitter 240. Power transmission device 10 further includes a power supply electronic control unit (ECU) 250, a communication device 260, a voltage sensor 270, and current sensors 272 and 274.

PFC circuit 210 can rectify and boost alternating-current (AC) power received from an AC power supply 100 (for example, a system power supply) and supply resultant power to inverter 220, and can correct a power factor by making an input current more sinusoidal. Various known PFC circuits can be adopted for PFC circuit 210. Instead of PFC circuit 210, a rectifier without a power factor correction function may be adopted.

Inverter 220 is configured to convert input electric power (more specifically, direct-current (DC) power) from PFC circuit 210 into AC power at a prescribed frequency and output AC power to power transmitter 240. Output power from inverter 220 is supplied to power transmitter 240 through filter circuit 230. In the embodiment, inverter 220 is a voltage source inverter (for example, a single-phase full bridge circuit shown in FIG. 3 which will be described later). Inverter 220 is configured to vary a frequency of output power (output frequency) within a prescribed frequency range (which is also referred to as an "output frequency range" below). Each switching element implementing inverter 220 is controlled in accordance with a drive signal from power supply ECU 250. The output frequency from inverter 220 is varied in accordance with a switching frequency indicated by the drive signal (which is also referred to as a "drive frequency" below). The drive frequency for inverter 220 matches with the output frequency from inverter 220 and hence with a power transmission frequency (a frequency of transmission power). Though details will be described later, a duty of an output voltage from inverter 220 is controlled also in accordance with a drive signal from power supply ECU 250. Then, magnitude of output power from inverter 220 is varied in accordance with the duty of the output voltage from inverter 220. The duty of the output voltage from inverter 220 is defined as a ratio of a positive (or a negative) voltage output time period to a cycle of a waveform of the output voltage (a rectangular wave) (see FIG. 4 which will be described later).

Voltage sensor 270 detects an output voltage Vo from inverter 220 and outputs a detected value thereof to power supply ECU 250. Current sensor 272 detects an output current Iinv from inverter 220 and outputs a detected value thereof to power supply ECU 250. Power supply ECU 250 can detect output power from inverter 220 based on detection values from voltage sensor 270 and current sensor 272.

Filter circuit 230 suppresses harmonic noise generated from inverter 220. Filter circuit 230 is implemented, for example, by an LC filter including an inductor and a capacitor.

Power transmitter 240 receives output power (AC power) from inverter 220 through filter circuit 230 and wirelessly transmits power to a power receiver 310 of power reception device 20 through magnetic field generated around power transmitter 240. Power transmitter 240 includes a resonant circuit (for example, a series resonant circuit shown in FIG. 2 which will be described later). Current sensor 274 detects a current Is which flows to power transmitter 240 and outputs a detected value thereof to power supply ECU 250.

Power supply ECU 250 includes a central processing unit (CPU) as a processor, a storage device, and an input and output buffer (none of which is shown). The storage device includes a random access memory (RAM) as a working memory and a storage for saving (for example, a read only memory (ROM) and a rewritable non-volatile memory). Power supply ECU 250 has a timer function. The timer function can be performed by either of hardware and software. Power supply ECU 250 carries out various types of control by execution by the CPU of a program stored in the storage device. Various types of control can also be processed by dedicated hardware (electronic circuits) without being limited to processing by software. Power supply ECU 250 according to the embodiment corresponds to one example of the "controller" according to the present disclosure.

Communication device 260 is configured to wirelessly communicate with a communication device 370 of power reception device 20. Communication device 260 sends information to power reception device 20 or receives information (for example, target power which will be described later) from power reception device 20.

Power reception device 20 includes power receiver 310, a filter circuit 320, a rectification circuit 330, a relay circuit 340, and a power storage device 350. Power reception device 20 further includes a charge ECU 360, communication device 370, a voltage sensor 380, and a current sensor 382.

Power receiver 310 includes a resonant circuit (for example, a series resonant circuit shown in FIG. 2 which will be described later) for wirelessly receiving power from power transmitter 240. Power receiver 310 outputs received power to rectification circuit 330 through filter circuit 320.

Filter circuit 320 is configured to suppress harmonic noise generated during reception of power by power receiver 310. Filter circuit 320 is implemented, for example, by an LC filter including an inductor and a capacitor. Rectification circuit 330 rectifies AC power received by power receiver 310 and outputs rectified AC power to power storage device 350. Rectification circuit 330 includes a smoothing capacitor together with a rectifier.

Relay circuit 340 is provided between rectification circuit 330 and power storage device 350. Relay circuit 340 is subjected to on/off control by charge ECU 360 and it is turned on (set to a conducting state) while power storage device 350 is charged by power transmission device 10.

Power storage device 350 is a rechargeable DC power supply, and implemented, for example, by a secondary battery such as a lithium ion battery or a nickel metal hydride battery. Power storage device 350 stores power output from rectification circuit 330. Power stored in power storage device 350 is supplied to a not-shown load driving device. An electric double layer capacitor can also be adopted as power storage device 350.

Voltage sensor 380 detects an output voltage (a reception power voltage) from rectification circuit 330 and outputs a detected value thereof to charge ECU 360. Current sensor 382 detects an output current (a reception power current) from rectification circuit 330 and outputs a detected value thereof to charge ECU 360. Power received by power receiver 310 (that is, charging power for power storage device 350) can be detected based on detection values from voltage sensor 380 and current sensor 382.

Charge ECU 360 includes a CPU as a processor, a storage device, and an input and output buffer (none of which is shown), and receives signals from various sensors and controls various types of equipment in power reception device 20. Various types of control can also be processed by dedicated hardware (electronic circuits) without being limited to processing by software.

Communication device 370 is configured to wirelessly communicate. Wireless communication between communication device 370 of power reception device 20 and communication device 260 of power transmission device 10 allows exchange of information between power supply ECU 250 and charge ECU 360.

Figure 2:
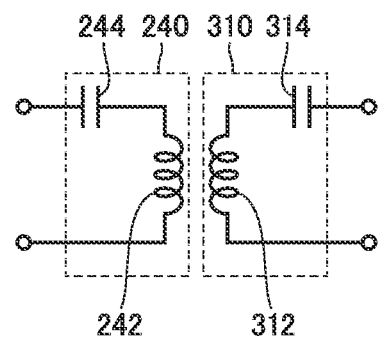
FIG. 2 is a diagram showing one example of a circuit configuration of a power transmitter and a power receiver of the power transfer system shown in FIG. 1.

Each of power transmitter 240 and power receiver 310 shown in FIG. 1 includes a resonant circuit and is designed to resonate at a frequency of transmission power. FIG. 2 is a diagram showing one example of a circuit configuration of power transmitter 240 and power receiver 310.

Referring to FIG. 2, power transmitter 240 includes a coil 242 (a power transmission coil) and a capacitor 244 connected in series (that is, a series resonant LC circuit). A Q factor representing resonance intensity of the resonant circuit in power transmitter 240 is preferably not smaller than 100.

Power receiver 310 includes a coil 312 (a power reception coil) and a capacitor 314 connected in series (that is, a series resonant LC circuit). A Q factor of the resonant circuit in power receiver 310 is also preferably not smaller than 100.

Figure 3:
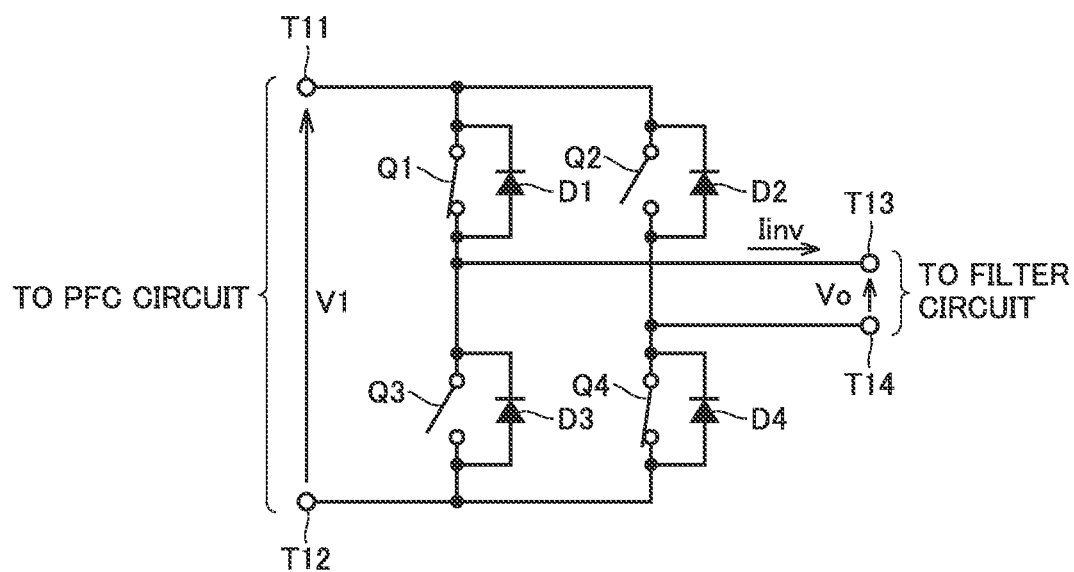
FIG. 3 is a diagram showing one example of a circuit configuration of an inverter shown in FIG. 1.

FIG. 3 is a diagram showing one example of a circuit configuration of inverter 220 shown in FIG. 1. Referring to FIG. 3, inverter 220 includes a plurality of switching elements Q1 to Q4 and a plurality of freewheel diodes D1 to D4. Switching elements Q1 to Q4 are each implemented by a power semiconductor switching element such as an IGBT, a bipolar transistor, a MOSFET, or a GTO. Freewheel diodes D1 to D4 are connected in parallel (more specifically, anti-parallel) to switching elements Q1 to Q4, respectively. PFC circuit 210 (FIG. 1) is connected to terminals T11 and T12 on a DC side and filter circuit 230 (FIG. 1) is connected to terminals T13 and T14 on an AC side.

A DC voltage output from PFC circuit 210 is applied across terminals T11 and T12. In FIG. 3, V1 represents magnitude of this DC voltage. Switching elements Q1 to Q4 are driven by a drive signal from power supply ECU 250. With a switching operation by switching elements Q1 to Q4, output voltage Vo is applied across terminals T13 and T14 so that output current Iinv flows (a direction shown with an arrow in FIG. 3 being defined as a positive direction). FIG. 3 shows a state that switching elements Q1 and Q4 are turned on and switching elements Q2 and Q3 are turned off by way of example, and output voltage Vo at this time is at substantially V1 (a positive value).

Figure 4:
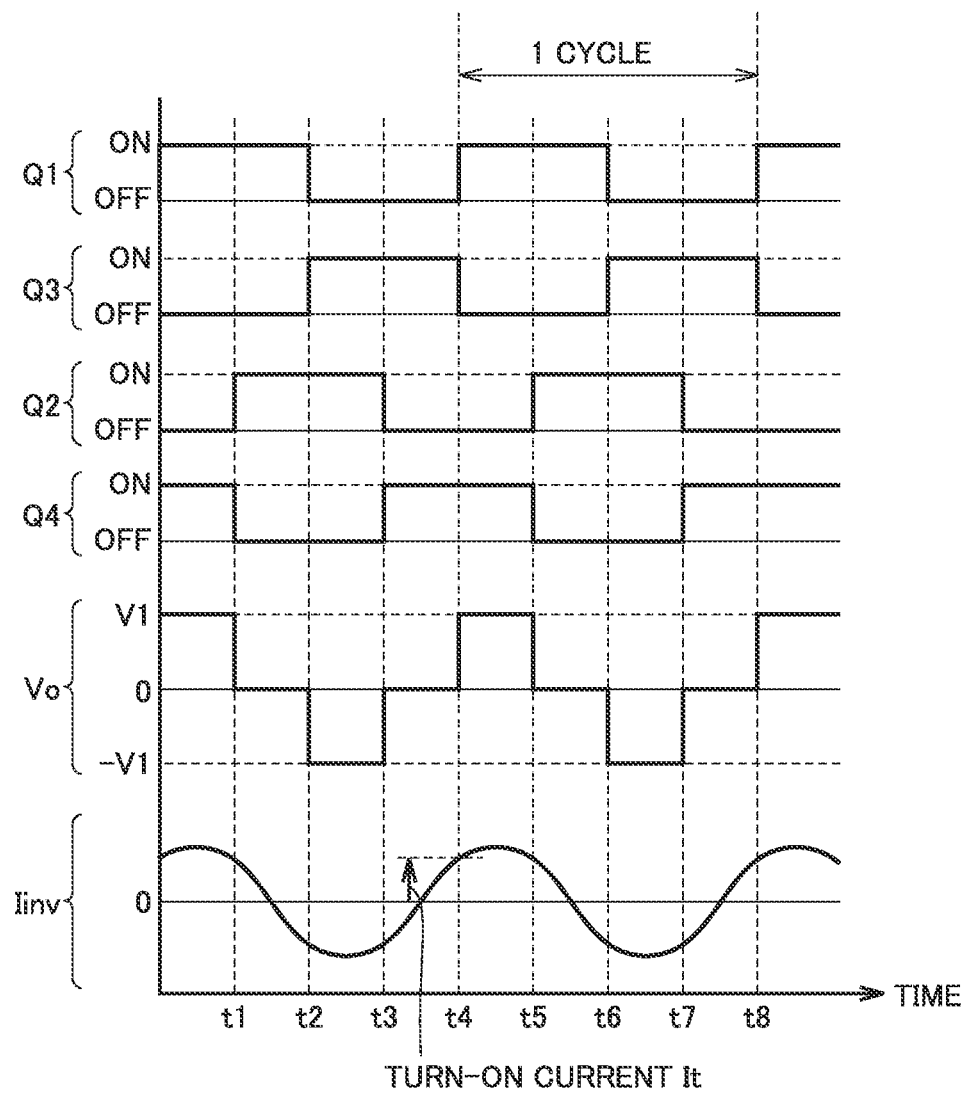
FIG. 4 is a diagram showing a waveform of switching of the inverter shown in FIG. 1, a waveform of an output voltage, and a waveform of an output current.

FIG. 4 is a diagram showing a waveform of switching of inverter 220 and a waveform of each of output voltage Vo and output current Iinv. An operation by inverter 220 will be described below with reference to FIG. 4 together with FIG. 3, by way of example of one cycle from time t4 to t8.

When switching element Q1 is switched from OFF to ON and switching element Q3 is switched from ON to OFF at time t4 while switching elements Q2 and Q4 are OFF and ON, respectively, each switching element is set to a state shown in FIG. 3 and output voltage Vo from inverter 220 rises from 0 to V1 (a positive value).

Thereafter, with variation in state of each switching element as shown below at time t5 to t8, output voltage Vo is also varied. When switching element Q2 is switched from OFF to ON and switching element Q4 is switched from ON to OFF at time t5, output voltage Vo attains to 0. When switching element Q1 is switched from ON to OFF and switching element Q3 is switched from OFF to ON at time t6, output voltage Vo attains to −V1 (a negative value). When switching element Q2 is switched from ON to OFF and switching element Q4 is switched from OFF to ON at time t7, output voltage Vo attains again to 0.

At time t8 which is one cycle after time t4, switching element Q1 is switched from OFF to ON and switching element Q3 is switched from ON to OFF. Each switching element is thus set to a state the same as the state at time t4 and output voltage Vo rises from 0 to V1 (positive value).

FIG. 4 shows an example where a duty of output voltage Vo is set to 0.25. A proportion of a positive voltage output time period (t4 to t5) in one cycle (t4 to t8) is ¼ (=0.25). A proportion of a negative voltage output time period (t6 to t7) in one cycle (t4 to t8) is also ¼ (=0.25). As the duty of output voltage Vo is higher, a time period during which output voltage Vo is positive (V1) and negative (−V1) in one cycle is longer. Therefore, as the duty of output voltage Vo is higher, output power from inverter 220 is higher.

By varying switching timing of switching elements Q1 and Q3 and switching timing of switching elements Q2 and Q4, a duty of output voltage Vo can be varied. For example, by advancing switching timing of switching elements Q2 and Q4 relative to the state shown in FIG. 4, a duty of output voltage Vo can be lower than 0.25 (a minimum value being 0). Alternatively, by retarding switching timing of switching elements Q2 and Q4 relative to the state shown in FIG. 4, a duty of output voltage Vo can be higher than 0.25 (a maximum value being 0.5).

By regulating a duty of output voltage Vo, magnitude of output power from inverter 220 and hence transmission power (electric power supplied to power transmitter 240) can be varied. Qualitatively, output power from inverter 220 can be increased by increasing a duty and can be decreased by decreasing a duty. Therefore, power supply ECU 250 can bring magnitude of output power from inverter 220 closer to target power by regulating a duty of output voltage Vo.

An instantaneous value of output current Iinv at the time of rise of output voltage Vo (time t4, t8) corresponds to a turn-on current It. Turn-on current It represents an output current from inverter 220 at the time of rise of an output voltage from inverter 220. A value of turn-on current It is varied in accordance with a voltage (V1) provided from PFC circuit 210 to inverter 220 and a drive frequency (a switching frequency) for inverter 220.

Conduction loss and switching loss define main power loss in power transmission device 10. Switching loss refers to power loss caused at the time of a switching operation (turn-on and turn-off). In power transmission device 10, power loss due to turn-on current It generated at the time of turn-on of a switching element which implements inverter 220 represents dominant switching loss. Conduction loss refers to power loss caused by conduction. In power transmission device 10, power loss due to heat generation resulting from conduction of coil 242 (power transmission coil) and inverter 220 represents dominant conduction loss.

For example, FIG. 4 shows an example in which positive turn-on current It flows. When positive turn-on current It flows, a current (that is, a recovery current) flows through freewheel diode D3 (see FIG. 3) connected in parallel to switching element Q3. When a recovery current flows through freewheel diode D3, heat generation in freewheel diode D3 increases and power loss in inverter 220 increases. When turn-on current It is not higher than 0, no recovery current flows through freewheel diode D3 and power loss in inverter 220 is suppressed. Since turn-on current It is varied in accordance with a drive frequency for inverter 220, power supply ECU 250 can control turn-on current It by regulating a drive frequency for inverter 220.

Though details will be described later, power supply ECU 250 detects power loss in power transmission device 10 in the embodiment. More specifically, the sum of power loss due to turn-on current It, power loss due to a current which flows through coil 242, and power loss due to a current which flows through inverter 220 is detected as power loss in power transmission device 10. Various methods are known as the method of detecting power loss and any method can be adopted.

Figure 5:
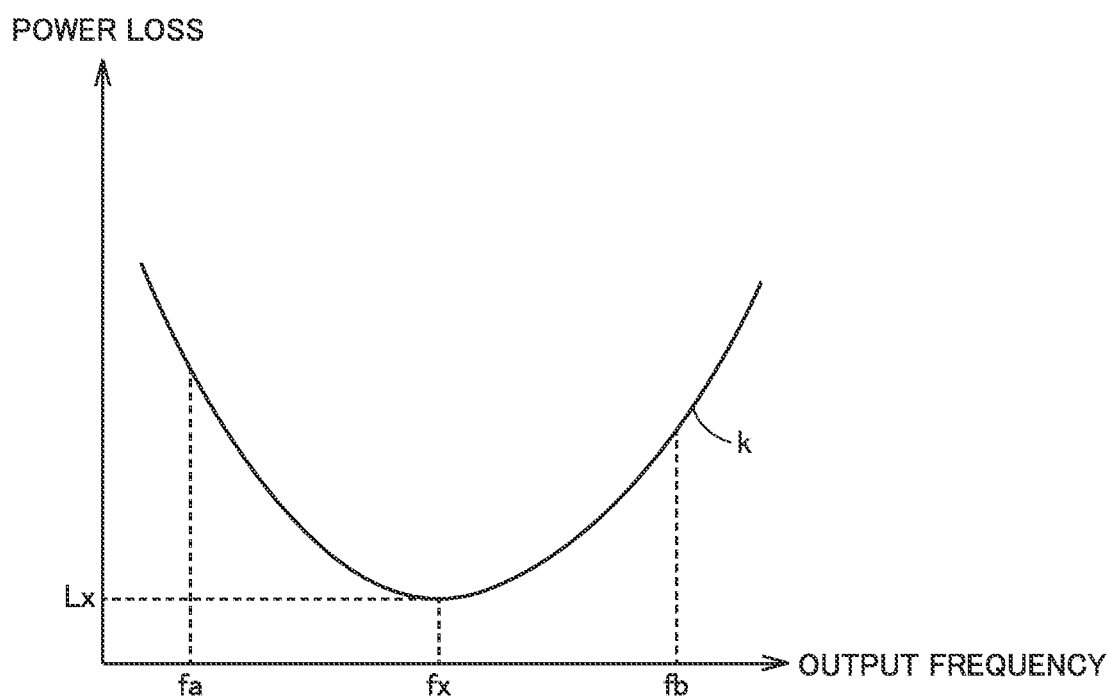
FIG. 5 is a diagram showing one example of relation between power loss in a power transmission device and an output frequency from the inverter in a situation that magnitude of output power from the inverter shown in FIG. 1 is constant.

Power loss in power transmission device 10 is varied by a drive frequency for inverter 220 and hence by an output frequency from inverter 220. FIG. 5 is a diagram showing one example of relation between power loss in power transmission device 10 and an output frequency from inverter 220 in a situation that magnitude of output power from inverter 220 is constant. In FIG. 5, fa and fb represent lower limit and upper limit frequencies within an output frequency range of inverter 220, respectively. Namely, fa to fb corresponds to the output frequency range of inverter 220.

Referring to FIG. 5, relation between an output frequency from inverter 220 (abscissa) and power loss in power transmission device 10 (ordinate) is shown with a curve k which projects downward. Power loss in power transmission device 10 is minimized (a relative minimum value Lx) at the time when the output frequency from inverter 220 attains to an optimal frequency fx (which is also simply referred to as "fx" below).

At an extreme value (fx) of curve k, an inclination of curve k is 0. In a region on a low-frequency side lower than fx, the inclination of curve k is negative, and as an output frequency from inverter 220 is closer to fx, the inclination of curve k is closer to 0. In a region on a high-frequency side higher than fx, the inclination of curve k is positive, and as the output frequency from inverter 220 is closer to fx, the inclination of curve k is closer to 0. The inclination of curve k thus represents positional relation between the output frequency from inverter 220 and optimal frequency fx.

In the embodiment, power supply ECU 250 carries out power control for controlling magnitude of output power from inverter 220 and extreme value search control for searching for an extreme value (an optimal frequency) of an output frequency from inverter 220. In power control, magnitude of output power from inverter 220 is converged to target power by regulating a duty of an output voltage from inverter 220. Magnitude of AC power can be expressed, for example, by an effective value. In extreme value search control, an output frequency from inverter 220 is converged to an optimal frequency by searching for an optimal frequency by oscillating the output frequency from inverter 220.

As power transmission device 10 simultaneously carries out power control and extreme value search control during power transfer from power transmission device 10 to power reception device 20, an optimal frequency (a frequency at which power loss is minimized) can be searched for (which is also referred to as "extreme value search" below) by varying the output frequency within the output frequency range of inverter 220 while magnitude of output power from inverter 220 is brought in conformity with target power. Power transfer at an optimal frequency at which power loss is low improves energy efficiency (a ratio of recoverable energy to input energy) in the entire power transfer system.

Figure 6:
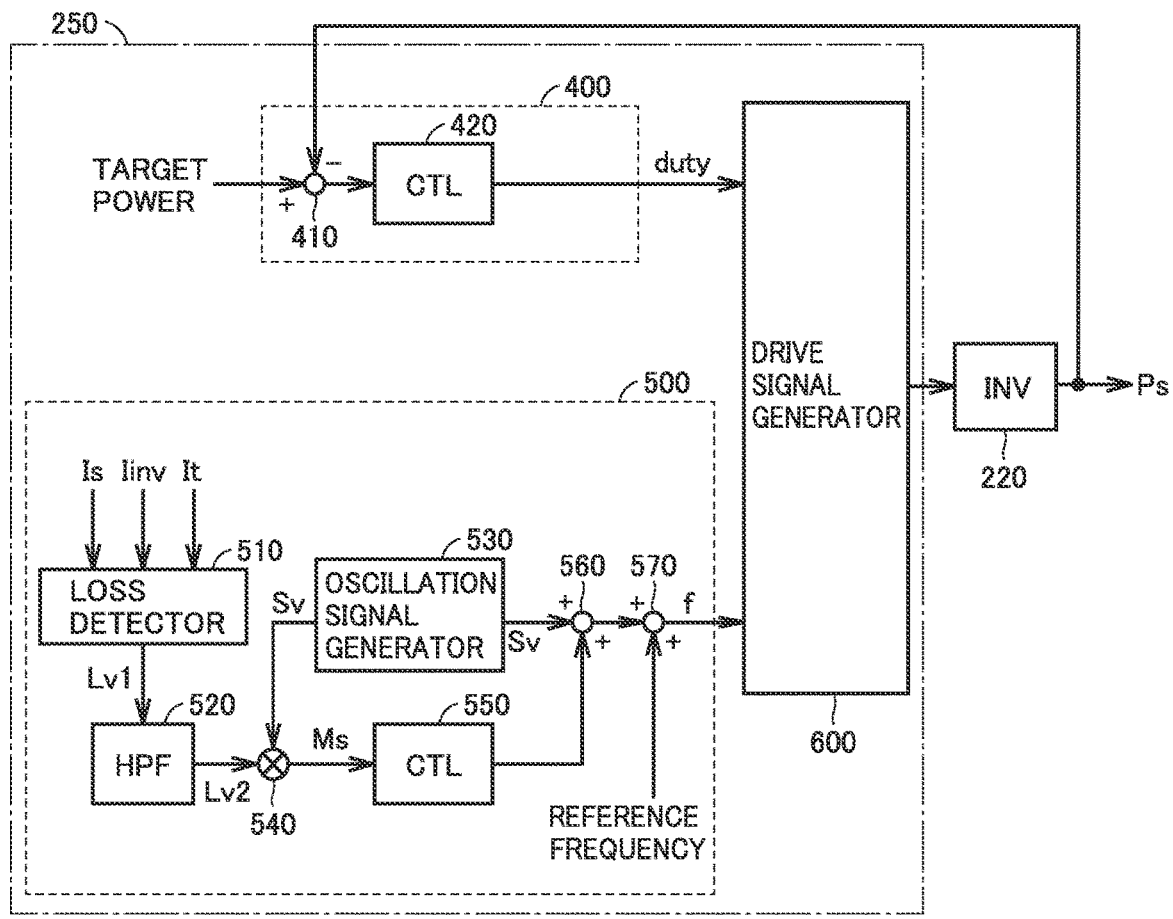
FIG. 6 is a control block diagram of power control and extreme value search control in a wireless power transmission device according to the embodiment of the present disclosure.

FIG. 6 is a control block diagram of power control and extreme value search control in power supply ECU 250. Referring to FIG. 6, power supply ECU 250 includes a power controller 400 which carries out power control, a frequency controller 500 which carries out extreme value search control, and a drive signal generator 600 which generates a drive signal for inverter 220.

Power controller 400 includes a subtractor 410 and a control circuit 420. Subtractor 410 subtracts a detected value of output power (which is referred to as "output power Ps" below) from inverter 220 from target power representing a target value of transmission power and outputs a calculated value (that is, a difference between target power and output power Ps) to control circuit 420. Output power Ps is calculated, for example, based on detection values from voltage sensor 270 and current sensor 272 shown in FIG. 1. Target power is generated, for example, in power reception device 20 based on a condition of power reception by power reception device 20 and transmitted from power reception device 20 to power transmission device 10.

Control circuit 420 generates a duty command value for an output voltage from inverter 220 based on the difference between target power and output power Ps and outputs the generated duty command value to drive signal generator 600. Control circuit 420 calculates an amount of manipulation for bringing the difference closer to 0, for example, by carrying out proportional integral control (PI control) with the difference between target power and output power Ps (output from subtractor 410) being received as an input, and sets the calculated amount of manipulation as duty command value. Feedback control of output power Ps to target power is thus carried out.

Frequency controller 500 includes a loss detector 510, a high-pass filter (HPF) 520, an oscillation signal generator 530, a multiplier 540, a control circuit 550, and adders 560 and 570.

Loss detector 510 detects power loss in power transmission device 10 (which is also simply referred to as "power loss" below) based on turn-on current It (which is also simply referred to as "It" below), current Is which flows to power transmitter 240 (which is also simply referred to as "Is" below), and output current Iinv from inverter 220 (which is also simply referred to as "Iinv" below). Detected power loss is the sum of power loss due to turn-on current It, power loss due to a current which flows through coil 242, and power loss due to a current which flows through inverter 220. Turn-on current It is expressed by a value (an instantaneous value) detected by current sensor 272 (FIG. 1) at the time when rise of output voltage Vo is sensed by voltage sensor 270 (FIG. 1). Current Is which flows to power transmitter 240 corresponds to a current which flows through coil 242 and is detected by current sensor 274 (FIG. 1). Output current Iinv from inverter 220 corresponds to a current which flows through inverter 220 and is detected by current sensor 272.

Information representing relation among It, Is, Iinv, and power loss (which is referred to as "loss detection information" below) can be used for detecting power loss. Loss detector 510 can find power loss based on It, Is, and Iinv by referring to loss detection information stored in a storage device of power supply ECU 250 in advance. Loss detection information may be expressed by any of a map, a table, an expression, and a model. Loss detection information may be combination of two or more of a map, a table, an expression, and a model.

Loss detector 510 repeatedly detects power loss in prescribed cycles. As power loss is cyclically detected, a waveform Lv1 of power loss is generated. Loss detector 510 outputs generated waveform Lv1 of power loss to HPF 520. A cycle of detection of power loss may be fixed or variable depending on a condition of power reception by power reception device 20.

HPF 520 extracts a high-frequency component Lv2 (for example, a signal obtained by removing a DC component from waveform Lv1 of power loss) from waveform Lv1 of power loss and outputs the extracted component to multiplier 540. HPF 520 is configured to attenuate substantially no high-frequency component higher than a cut-off frequency but to selectively reduce a low-frequency component equal to or lower than the cut-off frequency. With such HPF 520, a component (a high-frequency component) equal to or higher than a prescribed frequency (a cut-off frequency) of waveform Lv1 of power loss can be extracted. HPF 520 according to the embodiment corresponds to one example of the "extractor" according to the present disclosure.

Oscillation signal generator 530 generates an oscillation signal Sv indicating a waveform of a frequency manipulation amount for oscillating an output frequency from inverter 220 (which is referred to as a "first frequency manipulation amount" below) and outputs the oscillation signal to each of multiplier 540 and adder 560. During extreme value search control, the output frequency from inverter 220 is steadily oscillated by oscillation signal Sv. Though details will be described later, the first frequency manipulation amount represented by oscillation signal Sv is added to a drive frequency f for inverter 220 by adders 560 and 570. The output frequency from inverter 220 is thus oscillated. As a signal (a multiplication value Ms) representing an amount of variation in power loss involved with such oscillation is input to control circuit 550, control circuit 550 can know positional relation between the output frequency from inverter 220 and an optimal frequency and generate a signal for moving the operation frequency from inverter 220 to the optimal frequency.

When an amplitude of oscillation signal Sv is excessively large, output power from inverter 220 may be pulsed due to influence by oscillation of the output frequency from inverter 220. The amplitude of oscillation signal Sv is desirably made smaller to such an extent as achieving suppression of such pulsation. An amplitude of oscillation signal Sv can be varied in accordance with a result of poor proceeding determination which will be described later (see FIG. 9). Oscillation signal generator 530 according to the embodiment corresponds to one example of the "first generator" according to the present disclosure.

Multiplier 540 multiplies oscillation signal Sv input from oscillation signal generator 530 by high-frequency component Lv2 input from HPF 520. High-frequency component Lv2 represents an amount of variation in power loss (which is referred to as a "loss variation amount" below) at the time when an output frequency from inverter 220 is oscillated by oscillation signal Sv generated by oscillation signal generator 530. The loss variation amount represented by high-frequency component Lv2 corresponds to a differential coefficient (for example, an inclination of curve k shown in FIG. 5) of power loss.

Multiplier 540 generates multiplication value Ms resulting from multiplication of the loss variation amount represented by high-frequency component Lv2 by the first frequency manipulation amount represented by oscillation signal Sv and outputs the multiplication value to control circuit 550. Multiplication value Ms represents an amount of variation in power loss at the time when drive frequency f for inverter 220 is oscillated.

Control circuit 550 calculates a frequency manipulation amount (which is referred to as a "second frequency manipulation amount" below) for brining multiplication value Ms closer to 0 based on multiplication value Ms input from multiplier 540. Multiplication value Ms being closer to 0 means that an output frequency from inverter 220 is closer to an optimal frequency. The second frequency manipulation amount corresponds to an amount of manipulation for moving the output frequency from inverter 220 to the optimal frequency. Control circuit 550 calculates an amount of manipulation for bringing multiplication value Ms closer to 0, for example, by carrying out integral control (I control) with multiplication value Ms (an output from multiplier 540) being received as an input, and sets the calculated amount of manipulation as the second frequency manipulation amount. Control circuit 550 according to the embodiment corresponds to one example of the "calculator" according to the present disclosure.

Adder 560 adds oscillation signal Sv input from oscillation signal generator 530 to the second frequency manipulation amount input from control circuit 550 and outputs the calculated value to adder 570. Adder 570 obtains drive frequency f for inverter 220 by adding a prescribed reference frequency to a signal input from adder 560 (more specifically, a value resulting from addition of oscillation signal Sv and the second frequency manipulation amount). Then, drive frequency f generated by adder 570 is output to drive signal generator 600. A drive frequency at the time of startup of inverter 220 (which is referred to as a "startup frequency" below) can be adopted as the reference frequency. Though any startup frequency can be set, the startup frequency is preferably set to 81.4 kHz or 90.0 kHz when a frequency band defined under specifications or the like ranges from 81.4 kHz to 90.0 kHz.

Drive signal generator 600 generates a drive signal for inverter 220 (for example, a drive signal for switching elements Q1 to Q4 as shown in FIG. 4) based on duty command value input from power controller 400 and drive frequency f input from frequency controller 500. As inverter 220 is driven by the drive signal generated by drive signal generator 600, a duty of output voltage Vo from inverter 220 attains to a value corresponding to duty command value and an output frequency from inverter 220 attains to a value corresponding to drive frequency f. Drive signal generator 600 according to the embodiment corresponds to one example of the "second generator" according to the present disclosure.

In power control, calculation of a difference by subtractor 410, calculation of an amount of manipulation (a duty command value) by control circuit 420, and generation of a drive signal by drive signal generator 600 are repeatedly carried out and inverter 220 is driven by a drive signal generated based on the duty command value calculated by control circuit 420. Magnitude of output power from inverter 220 is thus controlled to converge to target power.

In extreme value search control, extraction of high-frequency component Lv2 by HPF 520, calculation of multiplication value Ms by multiplier 540, calculation of a second frequency manipulation amount by control circuit 550, and generation of a drive signal by drive signal generator 600 are repeatedly carried out and inverter 220 is driven by a drive signal generated based on the second frequency manipulation amount calculated by control circuit 550. Extreme value search described previously is thus carried out and an output frequency from inverter 220 is controlled to converge to an optimal frequency.

Power supply ECU 250 starts extreme value search, for example, when a request for power transmission is issued. The request for power transmission is issued, for example, when preparation for power transmission is completed. Examples of preparation for power transmission include alignment between power transmission device 10 and power reception device 20. During extreme value search, power transmission device 10 simultaneously carries out power control and extreme value search control. During extreme value search control, magnitude of output power from inverter 220 is controlled to target power under power control. Then, the output frequency is controlled to be brought closer to the optimal frequency under extreme value search control. Output power from inverter 220 driven by a drive signal generated under such control is supplied to power transmitter 240. Wireless power transfer from power transmitter 240 of power transmission device 10 to power receiver 310 of power reception device 20 is thus carried out.

When sensitivity of variation in power loss to frequency manipulation (frequency manipulation sensitivity) during extreme value search control becomes lower, search for an optimal frequency will poorly proceed and a drive frequency for inverter 220 (and hence an output frequency from inverter 220) may not be controlled to the optimal frequency.

In power transmission device 10 according to the embodiment, power supply ECU 250 determines whether or not extreme value search in extreme value search control is poorly proceeding, and when extreme value search is poorly proceeding, an amplitude of frequency oscillation is made larger than when extreme value search is not poorly proceeding. Thus, when extreme value search is poorly proceeding, poor proceeding of extreme value search is overcome by enhancing frequency manipulation sensitivity.

More specifically, power supply ECU 250 determines that extreme value search is poorly proceeding when an output frequency has converged in spite of incomplete extreme value search (that is, the output frequency from inverter 220 has not reached the optimal frequency). When extreme value search is poorly proceeding, power supply ECU 250 performs increasing manipulation to increase an amplitude of oscillation signal Sv by a prescribed unit width (a unit manipulation amount) and thereafter makes again a poor proceeding determination as to whether or not extreme value search is poorly proceeding, and when poor proceeding has not been overcome, repeats the increasing manipulation and poor proceeding determination until poor proceeding is overcome. Power supply ECU 250 determines that poor proceeding of extreme value search has been overcome when the output frequency is no longer in a converged state and is proceeding at a normal speed toward the optimal frequency by performing the increasing manipulation. Power supply ECU 250 performs decreasing manipulation to decrease an amplitude of oscillation signal Sv by a prescribed unit width (a unit manipulation amount) when poor proceeding of extreme value search has been overcome by the increasing manipulation. An amplitude of oscillation of the output frequency from inverter 220 is varied with variation in amplitude of oscillation signal Sv.

Figure 7:
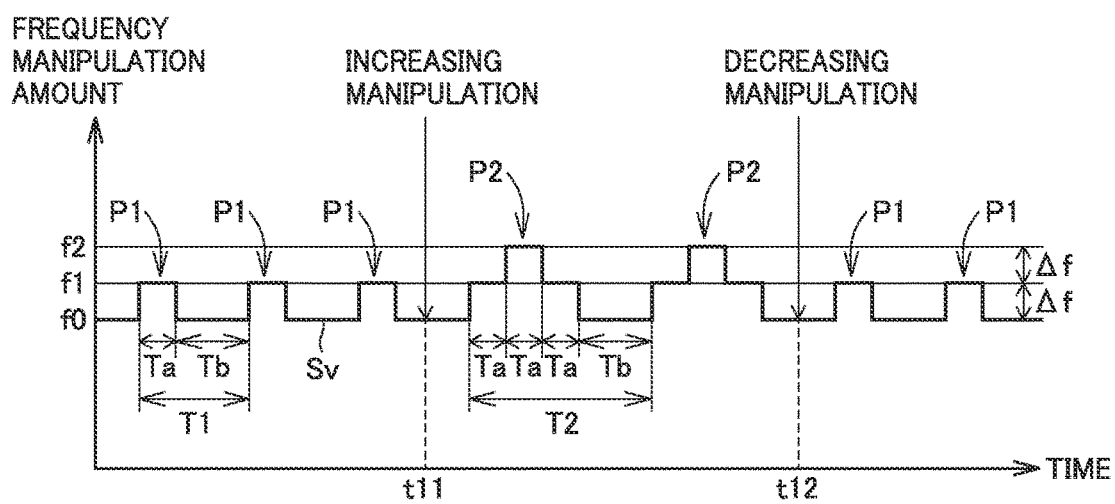
FIG. 7 is a diagram showing one example of variation in amplitude of an oscillation signal by increasing manipulation and decreasing manipulation in the wireless power transmission device according to the embodiment of the present disclosure.

FIG. 7 is a diagram showing one example of variation in amplitude of oscillation signal Sv by increasing manipulation and decreasing manipulation. In FIG. 7, the ordinate represents a first frequency manipulation amount and the abscissa represents time.

Referring to FIG. 7, oscillation signal Sv is a rectangular wave signal (for example, successive pulse signals) of which amplitude representing magnitude of the first frequency manipulation amount increases and decreases stepwise. In this embodiment, a pulse interval Tb in oscillation signal Sv is set to be constant (a fixed value). In oscillation signal Sv, a frequency manipulation amount (low level) during pulse off is denoted as f0. Though f0 can be set to any value, it is set, for example, to 0. A frequency manipulation amount (high level) during pulse on is varied by the increasing manipulation and the decreasing manipulation described above.

At an initial stage (until increasing manipulation is performed at timing t11), oscillation signal Sv is a rectangular wave signal in which a pulse P1 having a pulse width Ta appears in prescribed oscillation cycles T1. The high level of pulse P1 is denoted as f1. An amplitude of pulse P1 is denoted as $\Delta f$ corresponding to a difference (an absolute value) between f0 and f1. $\Delta f$ corresponds to a unit manipulation amount. In the embodiment, $\Delta f$ is set to a smallest limit value determined by hardware which constitutes power transmission device 10 (a smallest frequency manipulation amount). Oscillation cycle T1 corresponds to the sum of pulse width Ta and pulse interval Tb.

As increasing manipulation is performed at timing t11, the number of steps of oscillation signal Sv increases by one and a pulse P2 of two steps is generated by oscillation signal generator 530. Oscillation signal Sv thus becomes a rectangular wave signal in which pulse P2 having a pulse width three times as large as pulse P1 (=Ta×3) appears in prescribed oscillation cycles T2. The high level of pulse P2 is denoted as f2 and an amplitude of pulse P2 corresponds to a difference (an absolute value) between f0 and f2. The amplitude of pulse P2 is greater by $\Delta f$ than pulse P1. The amplitude of pulse P2 corresponds to two times as large as $\Delta f$. The amplitude of oscillation signal Sv is increased by unit manipulation amount ($\Delta f$) by increasing manipulation. Oscillation cycle T2 corresponds to the sum of pulse width Ta×3 and pulse interval Tb. Oscillation cycle T2 is longer than oscillation cycle T1. The oscillation cycle of oscillation signal Sv is extended by increasing manipulation.

When poor proceeding of extreme value search is overcome by increasing manipulation, decreasing manipulation is performed. For example, in the example in FIG. 7, decreasing manipulation is performed at timing t12. As decreasing manipulation is performed, the number of steps of oscillation signal Sv decreases by one and oscillation signal generator 530 generates pulse P1 of one step. The amplitude of oscillation signal Sv is decreased by a unit manipulation amount (Δf) by decreasing manipulation. Oscillation signal Sv thus returns to the original state (the state before increasing manipulation) and it becomes a rectangular wave signal having pulse P1 (that is, a pulse of one step). An oscillation cycle of oscillation signal Sv is shortened by decreasing manipulation.

Figure 8:
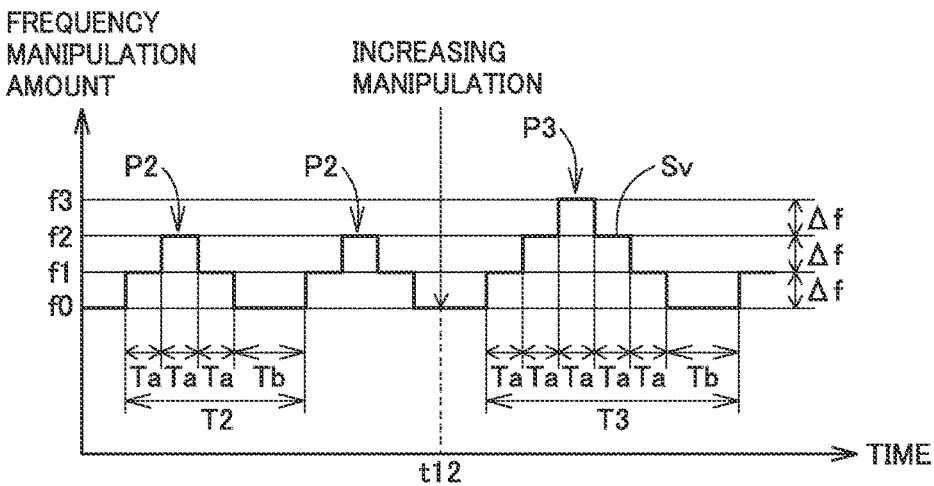
FIG. 8 is a diagram showing one example of variation in amplitude of an oscillation signal at the time when increasing manipulation is performed twice in the wireless power transmission device according to the embodiment of the present disclosure.

When poor proceeding of extreme value search is not overcome by increasing manipulation, further increasing manipulation is performed. FIG. 8 is a diagram showing one example of variation in amplitude of oscillation signal Sv at the time when such increasing manipulation is performed. In FIG. 8, the ordinate represents a first frequency manipulation amount and the abscissa represents time.

Referring to FIG. 8, when poor proceeding of extreme value search is not overcome by increasing manipulation described previously (increasing manipulation at timing t11 in FIG. 7), increasing manipulation instead of decreasing manipulation (FIG. 7) described previously is performed at timing t12. The number of steps of oscillation signal Sv thus increases by one and a pulse P3 of three steps is generated by oscillation signal generator 530. Oscillation signal Sv becomes a rectangular wave signal in which pulse P3 having a pulse width five times as large as pulse P1 (=Ta×5) appears in prescribed oscillation cycles T3. The high level of pulse P3 is denoted as f3 and the amplitude of pulse P3 corresponds to a difference (an absolute value) between f0 and f3. The amplitude of pulse P3 is greater by Δf than pulse P2. The amplitude of pulse P3 corresponds to three times as large as Δf. The amplitude of oscillation signal Sv is increased by a unit manipulation amount (Δf) by increasing manipulation. Oscillation cycle T3 corresponds to the sum of pulse width Ta×5 and pulse interval Tb. Oscillation cycle T3 is longer than oscillation cycle T2. The oscillation cycle of oscillation signal Sv is extended by increasing manipulation.

By increasing and decreasing the amplitude of oscillation signal Sv stepwise as above, occurrence of pulsation of output power from inverter 220 at the time of increase and decrease in amplitude can be suppressed. A pulse width of oscillation signal Sv can be expressed as "the number of steps×2−1" times as large as a unit pulse width (Ta). For example, since pulse P3 has three steps, pulse P3 has a pulse width five times as large as Ta (=3×2−1).

Figure 9:
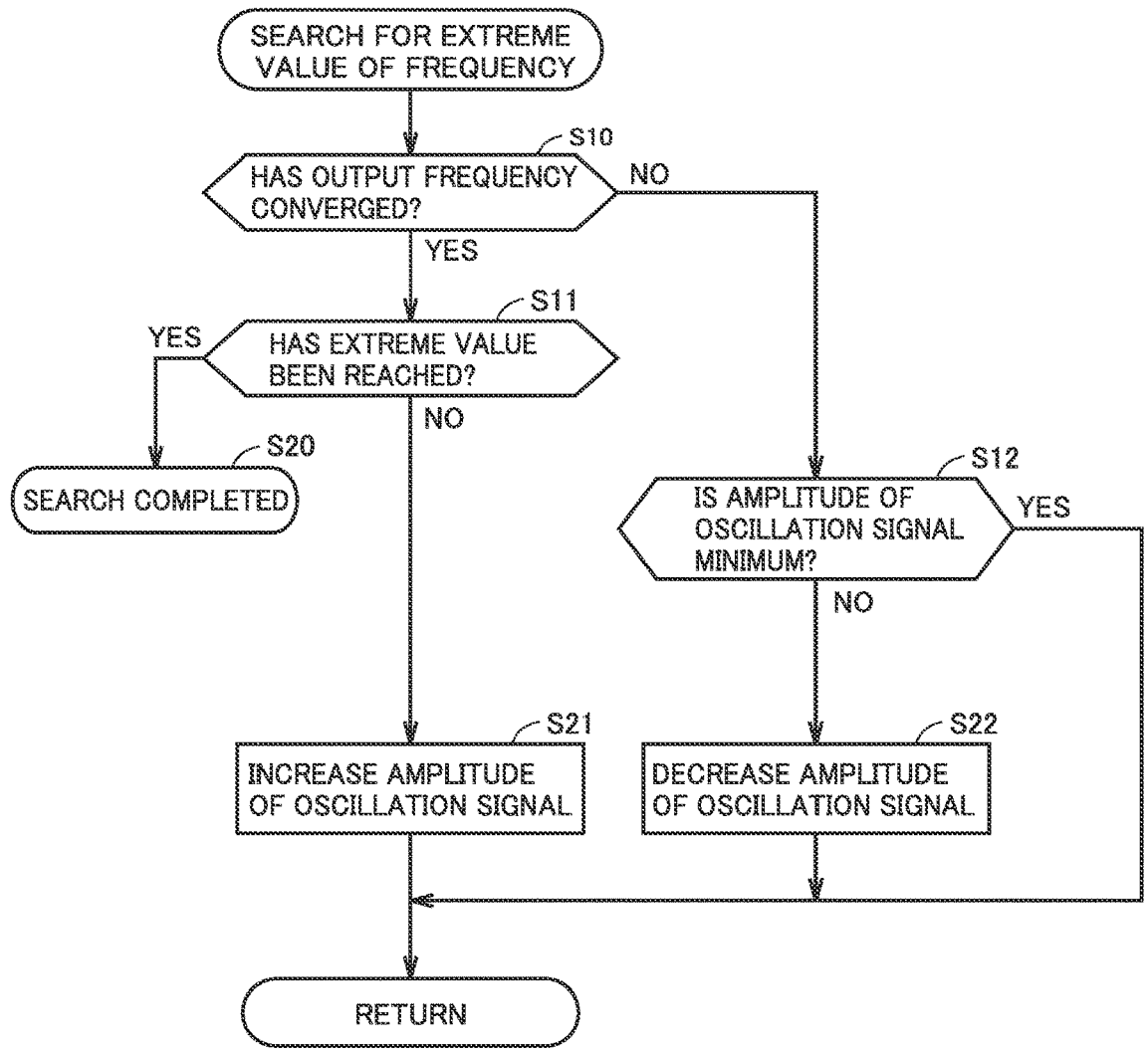
FIG. 9 is a flowchart for illustrating poor proceeding overcoming processing performed by a controller of the wireless power transmission device according to the embodiment of the present disclosure.

Processing for overcoming poor proceeding of extreme value search (which is also referred to as "poor proceeding overcoming processing" below) will be described below in detail with reference to FIG. 9. FIG. 9 is a flowchart for illustrating poor proceeding overcoming processing performed by power supply ECU 250. Processing shown in the flowchart includes steps S10 to S12 and S20 to S22 (which are referred to as "S10" to "S12" and "S20" to "S22" below), and it is performed as being called from a main routine each time a prescribed period of time elapses during extreme value search control and repeatedly performed until extreme value search is determined as being completed in S20.

Referring to FIG. 9, power supply ECU 250 determines whether or not an output frequency from inverter 220 has converged (S10). Convergence can be determined, for example, based on magnitude of an amount of variation during an immediately preceding period (which is also referred to as a "convergence determination period" below). For example, immediately after start of extreme value search, the convergence determination period refers to a period from start of extreme value search until lapse of a prescribed period of time. When an amplitude of oscillation signal Sv is increased and decreased in S21 and S22 which will be described later, a period from increase and decrease in amplitude until lapse of a prescribed period of time can be defined as the convergence determination period. In S10, for example, when an amount of variation in output frequency from inverter 220 during the convergence determination period (for example, a difference between a minimum value and a maximum value during the convergence determination period) is sufficiently small, the output frequency is determined as having converged. A prescribed threshold value found through experiments in advance can be used for determining whether or not an amount of variation is sufficiently small. For example, when an amount of variation is equal to or smaller than a threshold value, the output frequency is determined as having converged, and when the amount of variation exceeds the threshold value, the output frequency is determined as not having converged. Without being limited as such, various methods are known as a method of determining convergence and any method can be adopted.

When the output frequency has converged (YES in S10), power supply ECU 250 determines whether or not the output frequency has reached the optimal frequency (extreme value) (that is, the converged frequency is the optimal frequency) (S11). More specifically, at the optimal frequency, multiplication value Ms calculated by multiplier 540 attains to a value close to 0 (or exactly to 0). Therefore, when an absolute value of multiplication value Ms is greater than a prescribed threshold value, the converged frequency is determined as not being the optimal frequency, and when the absolute value of multiplication value Ms is smaller than the threshold value, the converged frequency is determined as the optimal frequency. The threshold value to be used in this determination can be found, for example, through experiments in advance. When it is determined in S11 that the output frequency has not reached the optimal frequency (that is, the converged frequency is not the optimal frequency), extreme value search is determined as poorly proceeding.

Any approach for determining whether or not the converged frequency is the optimal frequency is applicable. For example, power loss is minimized at the optimal frequency. Therefore, when power loss detected by loss detector 510 is more than a prescribed loss value, the converged frequency may be determined as not being the optimal frequency, and when power loss detected by loss detector 510 is less than the prescribed loss value, the converged frequency may be determined as the optimal frequency.

When the output frequency has reached the optimal frequency (extreme value) (YES in S11), extreme value search is determined as not poorly proceeding. In this case, since the output frequency from inverter 220 has converged to the optimal frequency, power supply ECU 250 determines that the extreme value search has been completed (S20). Extreme value search control (and hence the processing in FIG. 9) thus ends.

When the output frequency has not reached the optimal frequency (extreme value) (NO in S11), extreme value search is determined as poorly proceeding, and power supply ECU 250 performs increasing manipulation to increase an amplitude of oscillation signal Sv by a unit manipulation amount (for example, Δf shown in FIG. 7) from a current value (S21).

While extreme value search is poorly proceeding, change of the output frequency in extreme value search substantially stops and the output frequency does not come closer to the extreme value. Therefore, an amount of change of the output frequency (and hence an amount of variation in output frequency) becomes small and the output frequency is determined in S10 as having converged (YES in S10).

In the embodiment, when the output frequency has converged in spite of incomplete extreme value search (that is, the output frequency from inverter 220 has not reached the extreme value) (YES in S10 and NO in S11), extreme value search is determined as poorly proceeding. When extreme value search is not poorly proceeding, extreme value search proceeds at a normal speed. Therefore, an amount of change of the output frequency (and hence an amount of variation in output frequency) increases, and determination as NO is made in S10 and the process proceeds to S12.

In S12, power supply ECU 250 determines whether or not an amplitude of oscillation signal Sv is minimum. In the embodiment, an amplitude (Δf) of pulse P1 (FIG. 7) at the time when oscillation signal Sv has one step corresponds to the minimum amplitude. When oscillation signal Sv has one step, determination as YES is made in S12, and when oscillation signal Sv has two or more steps, determination as NO is made in S12.

When the amplitude of oscillation signal Sv is not minimum (NO in S12), power supply ECU 250 performs decreasing manipulation to decrease the amplitude of oscillation signal Sv by a unit manipulation amount (for example, Δf shown in FIG. 7) from the current value (S22). Thus, for example, when oscillation signal Sv had three steps, oscillation signal Sv will have two steps, and when oscillation signal Sv had two steps, oscillation signal Sv will have one step. When the amplitude of oscillation signal Sv is minimum (YES in S12), that is, when oscillation signal Sv has one step, the amplitude of oscillation signal Sv cannot be decreased any more. Therefore, the process returns to the main routine without decreasing manipulation being performed.

In the processing in FIG. 9, determination as NO is made in S10 until the extreme value search poorly proceeds or is completed since start of extreme value search. In the initial stage (for example, a period until timing t11 in FIG. 7), oscillation signal Sv is a rectangular wave signal having pulse P1 (FIG. 7). Therefore, determination as YES is made in S12 and the process returns to the main routine.

When extreme value search poorly proceeds while extreme value search control is being carried out, determination as YES is made in S10 and determination as NO is made in S11, and increasing manipulation is performed in S21. With this increasing manipulation, oscillation signal Sv becomes a rectangular wave signal having pulse P2 (FIG. 7).

When poor proceeding of extreme value search has been overcome by increasing manipulation, the output frequency starts to change toward the extreme value (optimal frequency). An amount of change of the output frequency (and hence an amount of variation in output frequency) thus increases, the output frequency is determined as not having converged in S10 (NO in S10), and the process proceeds to S12. Since oscillation signal Sv is a rectangular wave signal having pulse P2 (FIG. 7) in this case, determination as NO is made in S12 and decreasing manipulation is performed in S22. With this decreasing manipulation, oscillation signal Sv becomes a rectangular wave signal having pulse P1 (FIG. 7).

When poor proceeding of extreme value search is not overcome by increasing manipulation, determination as YES is made in S10 and determination as NO is made in S11, and increasing manipulation is performed in S21. With this increasing manipulation, oscillation signal Sv becomes a rectangular wave signal having pulse P3 (FIG. 8). When poor proceeding of extreme value search is not overcome even by this increasing manipulation, further increasing manipulation is performed to set the number of steps of oscillation signal Sv to four. Increasing manipulation (S21) and poor proceeding determination (S10 and S11) are repeatedly performed until poor proceeding of extreme value search is overcome.

Poor proceeding of extreme value search may not be overcome due to some kind of an abnormal condition in the power transfer system. Therefore, when a prescribed suspension condition is satisfied, loop processing above may exit (repeated processing of increasing manipulation and poor proceeding determination) and extreme value search may be suspended. For example, a suspension condition may be satisfied when the number of steps of oscillation signal Sv exceeds a prescribed number of steps. The prescribed number of steps is defined as a threshold value for sensing an abnormal condition, and for example, an upper limit value which can be taken under a normal condition is set. When the suspension condition is satisfied, a user may be notified of the abnormal condition.

In extreme value search control, an optimal frequency (extreme value) is searched for by oscillating the output frequency from inverter 220, to thereby gradually bring the output frequency closer to the optimal frequency. Finally, the output frequency is brought in conformity with the optimal frequency. When there is a low-sensitivity frequency (a frequency particularly low in frequency manipulation sensitivity among output frequencies from inverter 220) while the output frequency changes toward the optimal frequency in extreme value search control, change of the output frequency may substantially stop at the low-sensitivity frequency, extreme value search may poorly proceed, and the output frequency may not be able to reach the optimal frequency.

In such a case, in the processing in FIG. 9, extreme value search is determined as poorly proceeding (YES in S10 and NO in S11), and increasing manipulation (S21) is performed. Thus, the amplitude of oscillation signal Sv while extreme value search is poorly proceeding becomes larger than the amplitude of oscillation signal Sv while extreme value search is not poorly proceeding (NO in S10). By increasing the amplitude of oscillation signal Sv (and the amplitude of oscillation of the frequency), frequency manipulation sensitivity can be enhanced. By enhancing frequency manipulation sensitivity, change of the output frequency is promoted and hence poor proceeding of extreme value search can be overcome.

In the embodiment, the amplitude of oscillation signal Sv is increased by a unit manipulation amount (for example, Δf shown in FIG. 7) by performing increasing manipulation once, and determination as to poor proceeding (determination as to whether or not poor proceeding of extreme value search has been overcome) is made each time increasing manipulation is performed. Increase in amplitude is stopped when poor proceeding is overcome by increasing the amplitude of oscillation signal Sv gradually (in increments of a unit manipulation amount). By doing so, the possibility of increase in amplitude more than necessary and resultant occurrence of pulsation in output power can be lowered. Since pulsation in output power tends to be less likely as the unit manipulation amount (Δf) is smaller, a smallest limit value (a minimum frequency manipulation amount) determined by hardware which constitutes power transmission device 10 is adopted as Δf in the embodiment.

In the processing in FIG. 9, when poor proceeding of extreme value search is overcome by increasing manipulation, the amplitude of oscillation signal Sv returns by decreasing manipulation to the state before increasing manipulation (S22). According to experiments conducted by the inventors, a low-sensitivity frequency as above is locally present within an output frequency range, and frequency manipulation sensitivity becomes higher as the output frequency moves past the low-sensitivity frequency. Therefore, when poor proceeding of extreme value search is overcome by increasing manipulation, it is determined that the output frequency has moved past the low-sensitivity frequency, and pulsation in output power from inverter 220 is suppressed by decreasing the amplitude of oscillation signal Sv by performing decreasing manipulation.

In the embodiment, whether or not extreme value search in extreme value search control is poorly proceeding is determined based on determination as to whether the output frequency has converged (S10) and determination as to whether the converged frequency is the optimal frequency (S11). Without being limited as such, any approach for determining whether or not extreme value search is poorly proceeding is applicable.

A configuration for carrying out power control and extreme value search control in a wireless power transmission device is not limited to the configuration shown in FIG. 6 but can be modified as appropriate. For example, a low-pass filter may be provided between multiplier 540 and control circuit 550. Control circuit 550 may carry out PI control instead of I control.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A wireless power transmission device comprising:
   a power transmitter configured to wirelessly transmit power to a power reception device;
   an inverter configured to generate power at a prescribed frequency and output the generated power to the power transmitter;
   a loss detector configured to detect power loss; and
   a controller configured to control output power from the inverter, wherein
   the controller is configured to carry out extreme value search control for searching for an optimal frequency at which power loss detected by the loss detector is minimized, by oscillating a frequency of the output power during power transmission,
   the controller is configured to determine whether extreme value search in the extreme value search control is poorly proceeding and to increase a range of frequency oscillation of the output power when the extreme value search is poorly proceeding,
   the controller is configured to, based on a sensitivity of a variation in power loss to frequency manipulation lowering, determine that the extreme value search control is poorly proceeding,
   the controller includes:
      a first generator configured to generate an oscillation signal indicating a waveform of a first frequency manipulation amount for the fluency oscillation of the output power,
      an extractor configured to extract a high-frequency component from a waveform of power loss cyclically detected by the loss detector,
      a multiplier configured to obtain a multiplication value resulting from multiplication of a loss variation amount by the first frequency manipulation amount, the loss variation amount being represented by the high-frequency component, the first frequency manipulation amount being represented by the oscillation signal,
      a calculator configured to calculate a second frequency manipulation amount for bringing the multiplication value closer to 0, and
      a second generator configured to generate a drive signal for the inverter by using a prescribed reference frequency, the second frequency manipulation amount, and the oscillation signal,
   the oscillation signal is a rectangular wave signal of which range indicating magnitude of the first frequency manipulation amount increases and decreases stepwise, and
   a number of steps of the rectangular wave signal increases by one each time increasing manipulation is performed by the first generator and the number of steps of the rectangular wave signal decreases by one each time decreasing manipulation is performed by the first generator.

2. The wireless power transmission device according to claim 1, wherein
   the controller is configured to
   determine whether extreme value search in the extreme value search control is poorly proceeding,
   perform, when the extreme value search is poorly proceeding, increasing manipulation to increase the range of the frequency oscillation by a prescribed unit width and thereafter make a proceeding determination again as to whether the extreme value search is poorly proceeding, and
   repeat, when poor proceeding has not been overcome, the increasing manipulation and the proceeding determination until the poor proceeding is overcome.

3. The wireless power transmission device according to claim 2, wherein
   the controller is configured to perform decreasing manipulation to decrease the range of the frequency oscillation by the prescribed unit width when the poor proceeding is overcome by the increasing manipulation.

4. The wireless power transmission device according to claim 2, wherein
   a smallest limit value determined by hardware which constitutes the wireless power transmission device is defined as the prescribed unit width.

5. The wireless power transmission device according to claim 1, wherein
   during the extreme value search control, the controller is configured to
   vary the frequency of the output power to be closer to the optimal frequency while the controller brings magnitude of the output power in conformity with target power,
   determine, when the frequency of the output power has converged, whether the converged frequency is the optimal frequency,
   determine, when the converged frequency is the optimal frequency, that the extreme value search has been completed, and
   determine, when the converged frequency is not the optimal frequency, that the extreme value search is poorly proceeding.

6. The wireless power transmission device according to claim 1, wherein the power transmitter includes a resonant circuit including a power transmission coil, the inverter includes a switching element driven by drive signal from the controller and a freewheel diode connected in parallel to the switching element, and the loss detector is configured to detect the power loss by using a current flowing through the power transmission coil, a current flowing through the inverter, and a turn-on current representing an output current from the inverter at rise of an output voltage from the inverter.

7. A power transfer system comprising:

a power transmission device; and a power reception device configured to wirelessly receive power from the power transmission device, the power transmission device including a power transmitter configured to wirelessly transmit power to the power reception device, an inverter configured to generate power at a prescribed frequency and output the generated power to the power transmitter, a loss detector configured to detect power loss, and a controller configured to control output power from the inverter, wherein the controller is configured to carry out extreme value search control for searching for a frequency at which power loss detected by the loss detector is minimized, by oscillating a frequency of the output power during power transmission, the controller is configured to determine whether extreme value search in the extreme value search control is poorly proceeding and to increase a range of frequency oscillation of the output power when the extreme value search is poorly proceeding, the controller is configured to, based on a sensitivity of a variation in power loss to frequency manipulation lowering, determine that the extreme value search control is poorly proceeding, the controller includes, a first generator configured to generate an oscillation signal indicating a waveform of a first frequency manipulation amount for the frequency oscillation of the output power, an extractor configured to extract a high-frequency component from a waveform of power loss cyclically detected by the loss detector, a multiplier configured to obtain a multiplication value resulting from multiplication of a loss variation amount by the first frequency manipulation amount, the loss variation amount being represented by the high-frequency component, the first frequency manipulation amount being represented by the oscillation signal, a calculator configured to calculate a second frequency manipulation amount for bringing the multiplication value closer to 0, and a second generator configured to generate a drive signal form the inverter by using a prescribed reference frequency, the second frequency manipulation amount, and the oscillation signal, the oscillation signal is a rectangular wave signal of which range indicating magnitude of the first frequency manipulation amount increases and decreases stepwise, and a number of steps of the rectangular wave signal increases by one each time increasing manipulation is performed by the first generator and the number of steps of the rectangular wave signal decreases by one each time decreasing manipulation is performed by the first generator.

* * * * *